A. BARR AND W. STROUD.
ADJUSTER FOR RANGE FINDERS.
APPLICATION FILED AUG. 27, 1918.
1,309,174. Patented July 8, 1919.
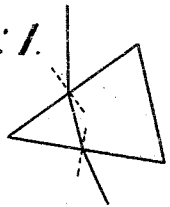
FIG: 1.
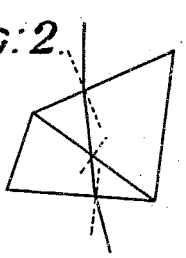
FIG: 2.
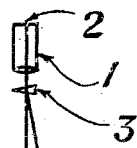
FIG: 3.
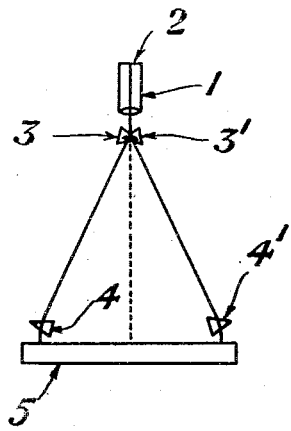
FIG: 4.
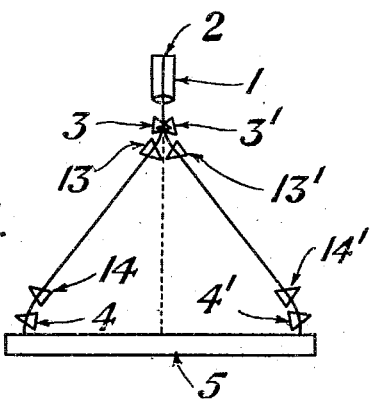
FIG: 5.
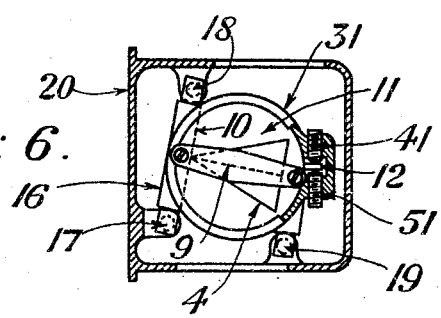
FIG: 6.
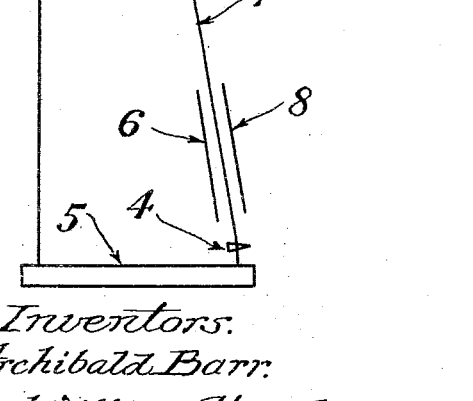
Inventors.
Archibald Barr.
William Stroud.
By J. Walter Fowler
atty.

UNITED STATES PATENT OFFICE.

ARCHIBALD BARR AND WILLIAM STROUD, OF ANNIESLAND, GLASGOW, SCOTLAND.

ADJUSTER FOR RANGE-FINDERS.

1,309,174.     Specification of Letters Patent.     Patented July 8, 1919.

Application filed August 27, 1918. Serial No. 251,670.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Adjusters for Range-Finders, of which the following is a specification.

Our invention relates to adjusters for the adjustment of the infinity position of self-contained base range-finders in a fixed position, either on land or on board ship. In the case of a rangefinder in a fixed position on land a pole or other mark at a known long range is sufficient when it can be seen; but as this known range must be considerable, say, several thousand yards, so as to be embraced in the scale reading of the rangefinder, the mark is frequently obscured by mist or fog. It is for this reason common practice to fix two marks whose distance apart equals the base of the rangefinder at a much shorter range, say, a few hundred yards, in order to produce the equivalent of an infinitely distant mark. At these short ranges it becomes necessary to refocus the eyepiece of the rangefinder, in which case the separating line (in the case of a coincidence rangefinder, or the marks in the focal plane of the eyepieces in the case of a stereoscopic rangefinder) becomes slightly out of focus, thus impairing the accuracy of the setting of the infinity position.

The object of our invention is to provide improved adjusters for observing the equivalent of a mark at infinite or other defined range which shall be in exact focus at the separating line (or at the focal plane of the marks in the case of stereoscopic range-finders).

Our invention necessitates the provision of a single mark, say, by means of a collimator or its equivalent, which is adapted to furnish the optical equivalent of an infinitely distant mark by causing light after emergence from the collimator to be divided into two beams, diverted at a definite angle and subsequently rendered parallel to pass into the two windows of the range-finder respectively. For this purpose, according to our invention, refractive means are provided located near the collimator for causing the required division and diversion, associated with similar refractive means in the opposite optical sense located near the rangefinder for rendering the two beams parallel to pass into the two windows respectively. For example, light passing from, say, the upper half of the objective of the collimator may be intercepted and diverted from its initial direction and afterward rendered parallel to its initial direction to pass into one of the windows of the rangefinder, while light passing from the lower half of the objective may pass direct to the other window of the rangefinder without deviation from its initial direction, or light passing from the objective of the collimator may be intercepted and divided into two beams and each be diverted from its initial direction and afterward rendered parallel to one another to pass into the two windows of the rangefinder respectively.

For the purposes of this invention the refractive means may consist of either (1) a simple refracting prism of suitable material placed in its position of minimum deviation in the plane of observation; or (2) an achromatic refracting prism similarly placed.

For example, we may provide a collimator adjusted for infinity in a suitable position some distance $d$ in front of the rangefinder with the objective and the axis of collimation directed toward the middle and at right angles to the base of the rangefinder. In front of the upper half of the objective we place a simple refracting prism A and in front of the lower half of the objective a simple refracting prism B. Each of these prisms is carefully placed in its position of minimum deviation in the plane containing collimator and rangefinder when the latter is being directed on the collimator. If prism A deviates the light to the right we provide at the right hand window of the rangefinder suitable means for inserting a refracting prism A¹ (equal to A) in its minimum position so that the refraction of A¹ is oppositely directed to that of A. Similarly if prism B deviates the light to the left we provide prism B¹ (equal to B) for insertion at the left hand window, prism B¹ being in its minimum position of deviation when inserted.

The effect of the chromatic dispersion of the light through prism A (or B) is to produce an out-of-focus spectrum in the neighborhood of A¹. If the length of this spectrum is much larger than the aperture of A¹ the light passing through the pair of prisms will be fairly monochromatic; but in any case the rays from a single point of the mark in the focus of the collimating objective, whatever their color, will be all rendered parallel because the deviation produced by the prism A is exactly annulled by the prism A¹ so that the total deviation is zero whatever the color. Similarly with B and B¹. In order to give an absolute infinity adjustment it is important that A and A¹ should be equal as well as B and B¹, though A and B need not be equal. To insure this we may cut a single prism into two to form prisms A and A¹ and similarly with B and B¹.

If $b$=base of the rangefinder and $d$=distance between A and A¹ measured perpendicularly to the base of the rangefinder, the appropriate angle of deviation for prisms A and A¹ will be $\tan-1\frac{b}{2d}$; thus, if $b$ is 10 yards and $d$=100 yards the deviation should be 2° 52′ whereas for the same base if $d$ is 10 yards the deviation should be 26° 34′. The appropriate angles of the prism can be calculated when the refractive index is known.

One of the greatest advantages of utilizing the refraction of light in this way arises from the fact that the refractive index of glass is almost independent of temperature. In Landolt and Bornstein's Tabellen 2 Auflage p. 161a it is shown that crown glass is much superior to flint glass in this respect. In fact, it is there shown that the temperature co-efficients are negative for the red end of the spectrum and positive for the blue end in the case of crown glass. In the first case quoted the co-efficient is zero slightly on the blue side of the D line, while in the second case quoted the position is slightly on the red side of the D line. Now having adjusted the prisms A A¹, B and B¹ in their proper positions we may by a slight alteration of the value of the distance $d$ work with the particular spectral color for which the temperature co-efficient is zero.

In a second method we may use an achromatic prism in place of a single refracting prism, arranging it of course in its position of minimum deviation. The only advantage would appear to be a slight increase in light, but the probability is that an achromatic prism would be much more likely to be influenced by changes in temperature.

In every instance, however, with the present type of adjuster the effect of temperature changes—the great bugbear in rangefinder adjusters—is a differential one, $i.\ e.$, if the change of temperature produces a certain effect on, say, prism A, it should produce an equal effect on prism A¹, and as A and A¹ are opposed to each other in their optical action the resultant effect should be zero.

Two typical cases where our present invention may conveniently be applied are as follows:—

(a) The case of a fixed position rangefinder, say, for coast defence;

(b) The case of a rangefinder upon a mounting on board ship.

In each case we shall suppose the rangefinder has a base of 10 yards.

In case (a) we may erect the collimator, say, 200 yards from the rangefinder when, if we use the first method, we shall require the prisms to produce deviations of 1° 26′, $i.\ e.$, the prisms will have angles slightly less than 3°, and calculation shows that for an accuracy of $\frac{1}{3}$ second of arc the minimum deviation position must be correct to about ± half a degree.

In case (b) we may erect the collimator at the greatest practicable distance we can use on board ship and direct the rangefinder in azimuth upon the collimator when we require to test the adjustment. In the case of a rangefinder in a turret we may place the collimator as far forward as possible upon the turret itself. Suppose the distance between the prisms A and A¹ and that between B and B¹ measured perpendicularly to the line joining the windows of the rangefinder is 10 yards then the angle of deviation must be 26° 34′ corresponding in the first method to an angle of about 45° for the prisms. In this case the position of minimum deviation for an accuracy of $\frac{1}{3}$ second of arc must be correct to about ± 6 minutes of arc.

We may, if desired, fix the prisms A¹ and B¹ to the turret instead of to the rangefinder, suitable provision being made for the removal of these prisms when the adjuster is not in use.

For producing the deviation required we may use two or more prisms instead of one prism for producing any or all of the deviations produced by the prisms A A¹, B and B¹.

Some examples according to our invention will now be described with reference to the accompanying drawing, in which:—

Figures 1 and 2 show two methods of deviating a beam of light, Fig. 3 shows an application of the invention under conditions where the collimator can be placed at a great distance from the rangefinder, Figs. 4 and 5 refer to conditions where the distance may be small and Fig. 6 shows a plan of a method of supporting one of the prisms.

In Fig. 1 is shown the path of a ray through a simple prism at minimum deviation, and Fig. 2 shows a corresponding diagram for an achromatic prism. In what follows we shall assume that simple prisms are used throughout, though it is to be understood that in each or any of the cases prisms according to Fig. 2 or other refracting prisms may be substituted for simple prisms.

In the adjusters to be described a collimator 1 with slit or crosswire 2 in the focus of the objective is used as the image for the rangefinder.

Fig. 3 represents the case of a rangefinder 5 being put into adjustment on a distant collimator 1 for a case where one pair of prisms only is used. In this case a beam from the lower half of the light emerging from the collimator 1 enters the left hand window of the rangefinder 5 directly while a beam from the upper half is refracted and dispersed by the prism 3. The red rays are indicated by 6, the green rays by 7 and the blue by 8. In this figure the amount of dispersion is greatly exaggerated for clearness. It will be seen that the rays to enter the prism 4 are chiefly the central spectral rays. However, after refraction through the prism these rays whatever their color undergo an equal amount of refraction to that imparted by the prism 3 but in the opposite direction so that if 2 represents a slit in an opaque screen illuminated by white light the yellow and green rays emerging from the objective of the collimator 1 will be parallel before they strike prism 3 and will be again parallel after traversing prisms 3 and 4 so that they will be brought into focus together in the focal plane of the rangefinder.

Fig. 4 may be taken as representing the case of a rangefinder in a turret on board ship in which case the parts 1, 3 and $3^1$ may be mounted in a suitable position on the fore part of the roof of the turret. Fig. 4 differs from Fig. 3 in that the prisms are of larger angle and two pairs of prisms 3, 4 and $3^1$, $4^1$ are provided, whereby light emerging from the collimator is divided into two beams and diverted by the prisms 3, $3^1$ and rendered parallel to one another by the prisms 4, $4^1$ respectively.

In the case of Fig. 5, prisms 3, 13, 14 and 4 are inserted in one beam and corresponding prisms $3^1$, $13^1$, $14^1$ and $4^1$ are inserted in the other beam. This system enables the collimator to be brought nearer to the rangefinder than could conveniently be done in the case of Fig. 4.

If it is desired to use the adjuster as the equivalent of an object at a constant definite distance to be determined by experiment it is not important that the angles of 3 and 4 (say, Fig. 3) shall be equal, nor is it important that the prisms 3 and 4 should be very exactly set but if it is desired to get an absolute adjuster equivalent to an object at an infinite distance, the prisms must be exactly equal in deviation (Fig. 3) and be very carefully set. In the case of Fig. 4, the sum of the angles of deviation of 3 and $3^1$ should be equal to the sum for 4 and $4^1$ and in the case of Fig. 5 the sum of 3 and 13, $3^1$ and $13^1$ equal to the sum of 4 14 $4^1$ and $14^1$, and in the case of each prism it must be carefully positioned.

Fig. 6 shows a plan of one method of adjusting the position of one of the prisms say 4. The adjustments required are three viz., (1) a rotation about an axis parallel to the edge of the prism (the adjustment for minimum deviation), (2) a rotation about an axis parallel to the line 9 bisecting the interior angle of the prism and (3) a rotation about an axis parallel to the line 10 perpendicular to the line 9. The prism 4 is securely fixed to a circular plate 11 capable of rotation inside a fixed ring 31. Ring 11 has a projecting arm 12 clamped between screws 41 and 51. By releasing one of these screws and correspondingly tightening the other, provision is made for adjustment (1). The circular ring 31 forms part of a carrier 16 supported by the frame 20 at the three points 17, 18 and 19, the line joining 17 and 19 being parallel to line 9, and 17 and 18 to line 10. The point 17 may represent a fixed pin while 18 may represent a screw for effecting adjustment (2) i. e., for rotation about line 17, 19 parallel to 9 while screw 19 may be used for adjustment (3), i. e., for rotation about line 17, 18 parallel to line 10. In the case of each of these adjustments the corresponding screw is rotated till the maximum or minimum displacement (as the case may be) of the image seen in the field of the rangefinder is obtained.

Each of the prisms may be mounted in a manner similar to that indicated in Fig. 6 thus, taking the case of Fig. 4 (where there are 4 prisms) 12 adjustments are necessary, three for each prism.

The prisms associated with the rangefinder may either be attached in a removable manner to the rangefinder, or they may be independently supported, say, upon the roof of the turret. If they are supported on the rangefinder they will turn in azimuth with the rangefinder and consequently the prisms will not be in the position of minimum deviation except at one point in the field of view, viz., that point for which the adjustment (1) has been carried out. In this case when using the adjuster we must use that particular part of the field.

We claim:

1. An optical adjuster for self-contained base rangefinders, consisting of a collimator, refractive means for causing light passing from the collimator to be divided into two beams and diverted at a definite angle associated with refractive means for subsequently rendering the two beams parallel, for the purposes set forth.

2. An optical adjuster for self-contained base rangefinders, consisting of a collimator, refractive means located near the collimator for causing light after emergence from the collimator to be divided into two beams and diverted at a definite angle, associated with refractive means at a distance from the collimator and located near the rangefinder for subsequently rendering the two beams parallel, for the purposes set forth.

3. An optical adjuster for self-contained base rangefinders, consisting of a collimator, refractive means located near the collimator for causing light passing from the collimator to be divided into two beams and for diverting one of the beams at a definite angle from its initial direction associated with refractive means at a distance from the collimator and located near the rangefinder for subsequently rendering the diverted beam parallel to its initial direction, for the purposes set forth.

4. An optical adjuster for self-contained base rangefinders, consisting of a collimator, refractive means located near the collimator for causing light passing from the collimator to be divided into two beams and for diverting the beams at a definite angle each from its initial direction, associated with refractive means at a distance from the collimator and located near the rangefinder for subsequently rendering the two beams parallel, for the purposes set forth.

5. An optical adjuster for self-contained base rangefinders, consisting of a collimator, refractive means for causing light passing from the collimator to be divided into two beams and diverted at a definite angle associated with refractive means for subsequently rendering the two beams parallel, the said means consisting of prisms, for the purposes set forth.

6. An optical adjuster for self-contained base rangefinders, consisting of a collimator, refractive means located near the collimator for causing light after emergence from the collimator to be divided into two beams and diverted at a definite angle associated with means at a distance from the collimator and located near the rangefinder for subsequently rendering the two beams parallel, the said means consisting of prisms, for the purposes set forth.

7. An optical adjuster for self-contained base rangefinders, consisting of a collimator, refractive means for causing light passing from the collimator to be divided into two beams and diverted at a definite angle associated with refractive means for subsequently rendering the two beams parallel, the said means consisting of refracting prisms placed in position of minimum deviation in the plane of observation, for the purposes set forth.

8. An optical adjuster for self-contained base rangefinders, consisting of a collimator, refractive means located near the collimator for causing light after emergence from the collimator to be divided into two beams and diverted at a definite angle associated with refractive means at a distance from the collimator and located near the rangefinder for subsequently rendering the two beams parallel, the said means consisting of refracting prisms placed in position of minimum deviation in the plane of observation, for the purposes set forth.

9. An optical adjuster for self-contained base rangefinders, consisting of a collimator, refracting prisms located near the mark for causing light passing from the collimator to be divided into two beams and for diverting the beams at a definite angle each from its initial direction associated with refracting prisms at a distance from the collimator and located near the rangefinder for subsequently rendering the two beams parallel, for the purposes set forth.

10. An optical adjuster for self-contained base rangefinders, consisting of a collimator arranged with its objective and axis of collimation directed toward the middle of and at right angles to the base of the rangefinder, two refracting prisms placed respectively in front of the two halves of the objective each prism in its position of minimum deviation in the plane containing the axis of collimation and base of the rangefinder for causing light after emergence from the collimator to be divided into two beams and diverted at a definite angle associated with two refracting prisms placed opposite the two windows of the rangefinder respectively each in its position of minimum deviation in the plane containing the axis of collimation and base of the rangefinder for rendering the two beams parallel, for the purposes set forth.

11. An optical adjuster for self-contained base rangefinders, consisting of a collimator, refractive means for causing light passing from the collimator to be divided into two beams and diverted at a definite angle associated with refractive means for subsequently rendering the two beams parallel, the said means consisting of refracting prisms each of equal refraction, for the purposes set forth.

12. An optical adjuster for self-contained base rangefinders consisting of a collimator, refractive means for causing light passing from the collimator to be divided into two beams and diverted at a definite angle, associated with refractive means for subsequently rendering the two beams parallel, the said means consisting of refracting prisms each mounted in a carrier having devices for effecting adjustments about three axes mutually at right angles to each other, for the purposes set forth.

ARCHIBALD BARR.
WILLIAM STROUD.

Witnesses:
NEIL J. MACLEAN,
JAMES WEIR FRENCH.